US011889366B2

(12) United States Patent
Takahashi et al.

(10) Patent No.: US 11,889,366 B2
(45) Date of Patent: Jan. 30, 2024

(54) BASE STATION FOR TRANSMISSION OF MESSAGE BETWEEN BASE STATIONS AND COMMUNICATION METHOD PERFORMED BY BASE STATION

(71) Applicant: NTT DOCOMO, INC., Tokyo (JP)

(72) Inventors: Hideaki Takahashi, Tokyo (JP); Tianyang Min, Tokyo (JP); Masato Taniguchi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 242 days.

(21) Appl. No.: 17/427,280

(22) PCT Filed: Feb. 8, 2019

(86) PCT No.: PCT/JP2019/004721
§ 371 (c)(1),
(2) Date: Jul. 30, 2021

(87) PCT Pub. No.: WO2020/161912
PCT Pub. Date: Aug. 13, 2020

(65) Prior Publication Data
US 2022/0124578 A1   Apr. 21, 2022

(51) Int. Cl.
*H04W 36/00* (2009.01)
*H04W 76/38* (2018.01)

(52) U.S. Cl.
CPC .  *H04W 36/00837* (2018.08); *H04W 36/0016* (2013.01); *H04W 76/38* (2018.02)

(58) Field of Classification Search
None
See application file for complete search history.

(56) References Cited

U.S. PATENT DOCUMENTS

2012/0300614 A1 * 11/2012 Ha ................. H04L 1/0045
370/216
2018/0302816 A1 * 10/2018 Yi ................. H04W 28/0205

OTHER PUBLICATIONS

Office Action issued in the counterpart Indian Patent Application No. 202117036820, dated Jan. 13, 2023 (6 pages).
Extended European Search Report in counterpart European Application No. 19 91 4610.1 dated Jul. 26, 2022 (20 pages).
Ericsson; "Text proposal for mobility related inter-node messages"; 3GPP TSG-RAN WG2 #99bis, R2-1710853; Prague, Czech Republic; Oct. 9-13, 2017 (8 pages).

(Continued)

*Primary Examiner* — Suhail Khan
(74) *Attorney, Agent, or Firm* — Osha Bergman Watanabe & Burton LLP

(57) ABSTRACT

A network node includes: a control unit configured to configure an information element in a field included in a message between network nodes in a case where the field is mandatory in the message between the network nodes, the message being used for performing communication configuration related to a user apparatus; and a transmission unit configured to transmit the message between the network nodes including the field in which the information element is configured, wherein the field is mandatory in the message between the network nodes in a case where a predetermined condition is satisfied.

3 Claims, 9 Drawing Sheets

Master Node (MN)

Secondary Node (SN)

UE

(56) References Cited

OTHER PUBLICATIONS

3GPP TS 36.423 V15.4.0; "3rd Generation Partnership Project; Technical Specification Group Radio Access Network; Evolved Universal Terrestrial Radio Access Network (E-UTRAN); X2 application protocol (X2AP) (Release 15)"; Dec. 2018 (409 pages).
Office Action issued in counterpart Japanese Patent Application No. 2020-570337 dated Feb. 7, 2023 (6 pages).
3GPP TS 38.331 V15.4.0, "3rd Generation Partnership Project; Technical Specification Group Radio Access Network; NR; Radio Resource Control (RRC) protocol specification (Release 15)"; Dec. 2018 (474 pages).
3GPP TS 36.331 V15.3.0, "3rd Generation Partnership Project; Technical Specification Group Radio Access Network; Evolved Universal Terrestrial Radio Access (E-UTRA); Radio Resource Control (RRC); Protocol specification (Release 15)"; Sep. 2018 (918 pages).
3GPP TS 38.300 V15.4.0, "3rd Generation Partnership Project; Technical Specification Group Radio Access Network; NR; NR and NG-RAN Overall Description; Stage 2 (Release 15)"; Dec. 2018 (97 pages).
3GPP TS 37.340 V15.4.0, "3rd Generation Partnership Project; Technical Specification Group Radio Access Network; Evolved Universal Terrestrial Radio Access (E-UTRA) and NR; Multi-connectivity; Stage 2"; Dec. 2018 (67 pages).
Office Action in the counterpart Japanese Application No. 2020-570337, dated Jul. 18, 2023 (5 pages).
Office Action in the counterpart Chinese Application No. 201980091126.5, dated Jul. 27, 2023 (14 pages).

\* cited by examiner

FIG.4

– *HandoverPreparationInformation*

This message is used to transfer the NR RRC information used by the target gNB during handover preparation, including UE capability information.
Direction: source gNB/source RAN to target gNB.

*HandoverPreparationInformation message*

```
HandoverPreparationInformation
HandoverPreparationInformation-IEs
  AS-Config
  RRCReconfiguration
  RRCReconfiguration-IEs
  RadioBearerConfig
  DRB-ToAddModList
  DRB-ToAddMod
  PDCP-Config
    discardTimer           ENUMERATED {ms10, ms20, ms30, ms40, ms50, ms60,
                           ms75, ms100, ms150, ms200, ms250, ms300, ms500,
                           ms750, ms1500, infinity}    OPTIONAL,  -- Cond Setup
```

FIG.6

*CG-ConfigInfo*

This message is used by master eNB or gNB to request the SgNB to perform certain actions e.g. to establish, modify or release an SCG. The message may include additional information e.g. to assist the SgNB to set the SCG configuration. It can also be used by a CU to request a DU to perform certain actions, e.g. to establish, modify or release an MCG or SCG.

Direction: Master eNB or gNB to secondary gNB, alternatively CU to DU.

*CG-ConfigInfo message*

```
CG-ConfigInfo
CG-ConfigInfo-IEs
  MeasConfigMN
    measGapConfig    SetupRelease { GapConfig }
```

FIG.7

11.2.X  Mandatory information in inter-node RRC messages

The *AS-Config* transferred between source gNB and target gNB via the *HandoverPreparationInformation* shall include all fields necessary to describe the AS context configured for the UE. The conditional presence in section 6 is only applicable for gNB to UE communication. The "need" or "cond" statements are not applied in case of sending the fields from source gNB to target gNB. Some fields shall be included regardless of the "need" or "cond" e.g. *discardTimer*.

For a field in *CG-Config* and *CG-ConfigInfo* which conveys the parameters configured for a UE, the sender shall include all the fields, unless stated otherwise in the field description or in this sub-clause. Based on the full CG configuration obtained from the source node, the target node can build a delta CG configuration to be configured for the UE. For the fields in which the IE defined in section 6 is contained, the "need" or "cond" statements are not applied in *CG-Config* and *CG-ConfigInfo*. Nevertheless, the following fields are exceptional and delta signalling is supported:

- *measGapConfig*.

For the above fields, the absence of fields means that the sender maintains the values informed via the previous message.

NOTE: When a new field is introduced in *CG-Config* or *CG-ConfigInfo*, and delta signalling is supported for the field, the field should be exclusively defined in those messages (i.e. do not reuse the IE defined for gNB to UE communication) by using the data type of *SetupRelease*.

BASE STATION FOR TRANSMISSION OF MESSAGE BETWEEN BASE STATIONS AND COMMUNICATION METHOD PERFORMED BY BASE STATION

TECHNICAL FIELD

The present invention relates to a network node in a wireless communication system.

BACKGROUND ART

Regarding NR (New Radio) (also referred to as "5G"), or a successor system to LTE (Long Term Evolution), technologies have been discussed which satisfy the following requirements: a high capacity system, high data transmission rate, low delay, simultaneous connection of multiple terminals, low cost, power saving, etc. (for example, Non-Patent Document 1).

In the NR system, similar to the dual connectivity in the LTE system, a technique called LTE-NR dual connectivity, NR-NR dual connectivity, or Multi-RAT (Multi Radio Access Technology) dual connectivity (hereinafter referred to as "MR-DC") is introduced, in which data is divided between a base station (eNB) of an LTE system and a base station (gNB) of an NR system, and the divided data sets are simultaneously transmitted or received by these base stations (for example, Non-Patent Document 2).

PRIOR ART DOCUMENT

Non-Patent Document

[Non-Patent Document 1] 3GPP TS 38.300 V15.4.0 (2018 December)
[Non-Patent Document 2] 3GPP TS 37.340 V15.4.0 (2018 December)

SUMMARY OF THE INVENTION

Problem to be Solved by the Invention

In the NR wireless communication system, there is a case in which, even though an RRC message between a user apparatus and a base station apparatus is optional, an inter-node RRC message between base station apparatuses related to the RRC message may be mandatory.

The present invention has been made in view of the above. It is an object of the present invention to transmit and receive information that is mandatory between network nodes in the wireless communication system.

Means for Solving Problem

According to the disclosed technique, provided is a network node including: a control unit configured to configure an information element in a field included in a message between network nodes in a case where the field is mandatory in the message between the network nodes, the message being used for performing a communication configuration related to a user apparatus; and a transmission unit configured to transmit the message between the network nodes including the field in which the information element is configured, wherein the field is mandatory in the message between the network nodes in a case where a predetermined condition is satisfied.

Effect of the Invention

According to the disclosed technique, information, which is mandatory between network nodes in the wireless communication system, can be transmitted and received.

BRIEF DESCRIPTION OF DRAWINGS

FIG. 4 is a drawing illustrating an information element used in the first operation example in an embodiment of the present invention.
FIG. 6 is a drawing illustrating an information element used in the second operation example in an embodiment of the present invention.
FIG. 7 is a specification change example related to an operation example in an embodiment of the present invention.

MODE FOR CARRYING OUT THE INVENTION

Figure 1:
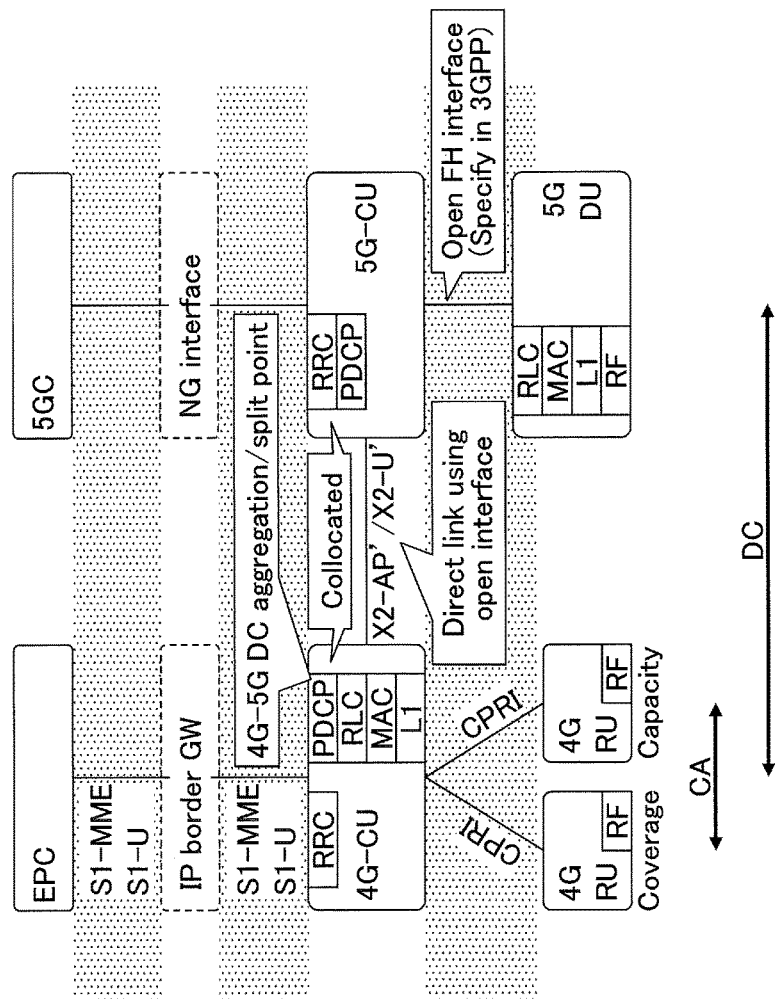
FIG. 1 is a drawing illustrating a configuration example of a network architecture according to an embodiment of the present invention.

In the following, referring to the drawings, one or more embodiments of the present invention will be described. It should be noted that the embodiments described below are examples. Embodiments of the present invention are not limited to the following embodiments.

In operations of a wireless communication system according to an embodiment of the present invention, conventional techniques will be used appropriately. With respect to the above, for example, the conventional techniques are related to, but not limited to, the existing LTE. Further, it is assumed that the term "LTE" used in the present specification has, unless otherwise specifically mentioned, a broad meaning including a scheme of LTE-Advanced and a scheme after LTE-Advanced (e.g., NR).

Further, in one or more embodiments described below, terms that are used in the existing LTE are used, such as SS (Synchronization Signal), PSS (Primary SS), SSS (Secondary SS), PBCH (Physical broadcast channel), PRACH (Physical random access channel), etc. The above-described terms are used for the sake of description convenience. Signals, functions, etc., which are similar to the above-described terms, may be referred to as different names. Further, terms, which are used in NR and correspond to the above-described terms, are NR-SS, NR-PSS, NR-SSS, NR-PBCH, NR-PRACH, etc. However, even when a signal is used for NR, there may be a case in which the signal is not referred to as "NR-".

Furthermore, in an embodiment of the present invention, the duplex method may be TDD (Time Division Duplex), FDD (Frequency Division Duplex), or other methods (e.g., Flexible Duplex, or the like).

Further, in an embodiment of the present invention, the expression, radio (wireless) parameters are "configured (set)" may mean that a predetermined value is pre-configured, or may mean that a radio parameter indicated by the base station apparatus 10 or the user apparatus 20 is configured.

FIG. 1 is a drawing illustrating a configuration example of a network architecture according to an embodiment of the present invention. As illustrated in FIG. 1, a radio network architecture in an embodiment of the present invention includes 4G-CU, 4G-RU (Remote Unit, Remote Radio Station), EPC (Evolved Packet Core), etc., on the LTE-Advanced side. The radio network architecture in an embodiment of the present invention includes 5G-CU, 5G-DU, etc., on the 5G side.

As illustrated in FIG. 1, the 4G-CU includes layers of RRC (Radio Resource Control), PDCP (Packet Data Convergence Protocol), RLC (Radio Link Control), MAC (Medium Access Control), and L1 (layer 1, PHY layer, or physical layer), and is connected to the 4G-RU via CPRI (Common Public Radio Interface). A network node including the 4G-CU and the 4G-RU is referred to as eNB.

On the other hand, on the 5G side, as illustrated in FIG. 1, the 5G-CU includes an RRC layer, is connected to the 5G-DU through FH (Flonthaul) interface, and is connected to 5GC (5G Core Network) through NG interface. In addition, the 5G-CU is connected to the 4G-CU through X2 interface. PDCP layer in the 4G-CU is a point of connection or separation in a case where 4G-5G DC (Dual Connectivity), i.e., EN-DC (E-UTRA-NR Dual Connectivity), is performed. A network node including the 5G-CU and the 5G-RU is referred to as gNB. In addition, the 5G-CU may be referred to as gNB-CU, and the 5G-DU may be referred to as gNB-DU.

In addition, as illustrated in FIG. 1, CA (Carrier Aggregation) is performed between 4G-RUs and DC is performed via the 4G-RU and the 5G-DU. Note that, though not shown in the figure, a UE (User Equipment) is wirelessly connected via RF of the 4G-RU or the 5G-DU, and transmits or receives packets.

Note that FIG. 1 illustrates a radio network architecture at the time of LTE-NR DC, i.e., EN-DC (E-UTRA-NR Dual Connectivity). However, the same radio network architecture may be used in a case where the 4G-CU is separated into CU-DU, or in a case where an NR standalone operation is performed. In a case where the 4G-CU is separated into CU-DU, functions related to an RRC layer and a PDCP may be moved to the 4G-CU, and functions related to an RLC layer and layer(s) therebelow may be included in the 4G-DU. Note that the data rate of CPRI may be decreased due to the CU-DU separation.

Note that a plurality of 5G-DUs may be connected to the 5G-CU. In addition, NR-DC (NR-NR Dual Connectivity) may be performed by connecting the UE to a plurality of 5G-CUs, and NR-DC may be performed by connecting the UE to a plurality of 5G-DUs and a single 5G-CU.

Figure 2:
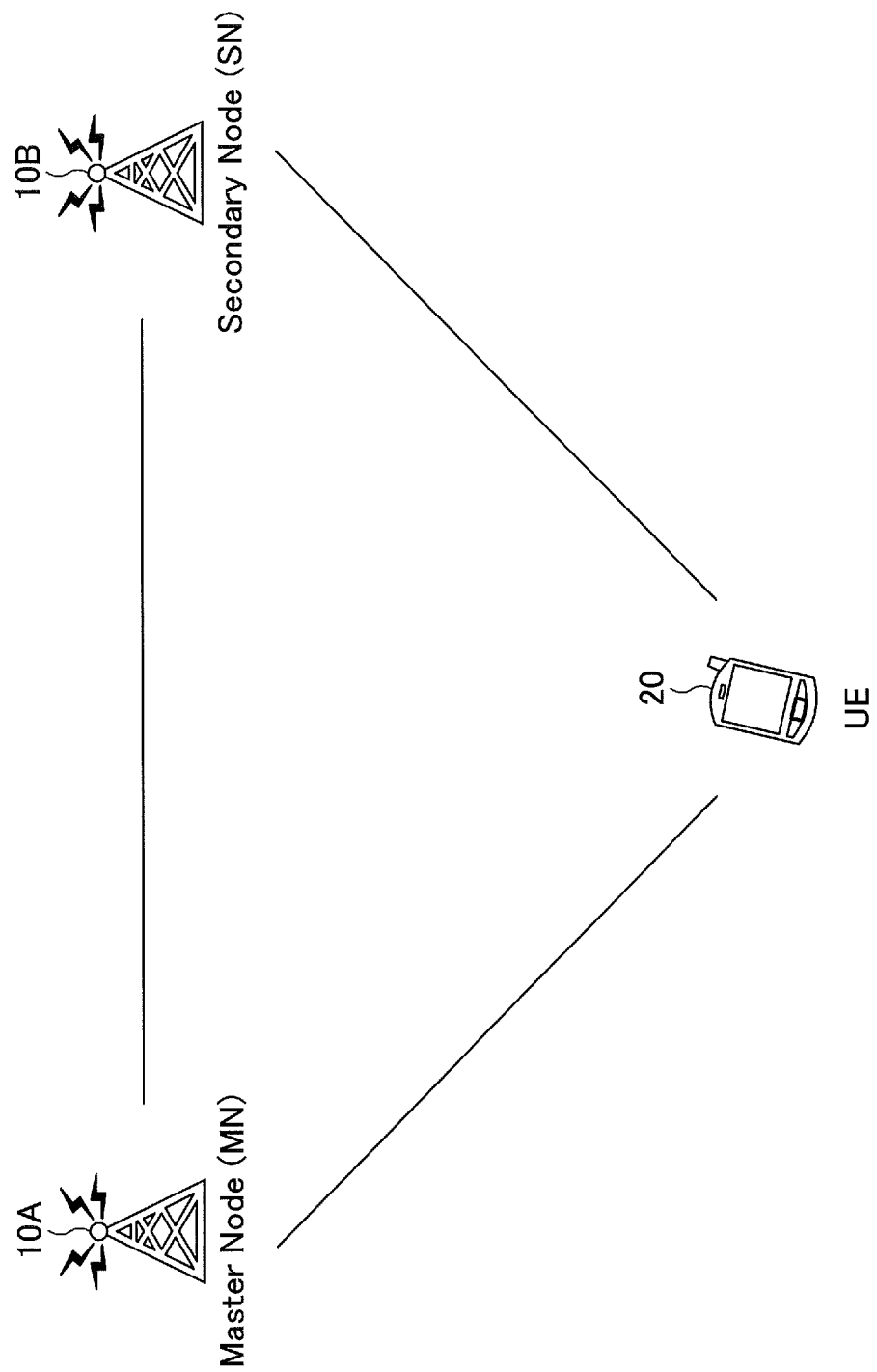
FIG. 2 is a drawing illustrating a configuration example of a wireless communication system according to an embodiment of the present invention.

FIG. 2 is a drawing illustrating a configuration example of a wireless communication system according to an embodiment of the present invention. FIG. 2 is a schematic diagram illustrating a wireless communication system at the time of MR-DC (Multi-RAT Dual Connectivity).

As illustrated in FIG. 2, a user apparatus 20 communicates with a base station apparatus 10A provided by an NR system and a base station apparatus 10B provided by the NR system (hereafter referred to as "base station apparatus 10" if the base station apparatus 10A and the base station apparatus 10B are not distinguished). In addition, the user apparatus 20 supports NR-NR dual connectivity, i.e., NR-DC, in which the base station apparatus 10A is a master node (hereinafter referred to as "MN") and the base station apparatus 10B is a secondary node (hereinafter referred to as "SN"). The user apparatus 20 can perform simultaneous transmission to or simultaneous reception from, the base station apparatus 10A as a master node and the base station apparatus 10B as a secondary node, by using a plurality of component carriers provided by the base station apparatus 10A as a master node and the base station apparatus 10B as a secondary node.

In addition, as illustrated in FIG. 2, a user apparatus 20 communicates with a base station apparatus 10A provided by an LTE system and a base station apparatus 10B provided by an NR system. In addition, the user apparatus 20 supports LTE-NR dual connectivity, i.e., EN-DC, in which the base station apparatus 10A is MN and the base station apparatus 10B is SN. The user apparatus 20 can perform simultaneous transmission to or simultaneous reception from, the base station apparatus 10A as a master node and the base station apparatus 10B as a secondary node, by using a plurality of component carriers provided by the base station apparatus 10A as a master node and the base station apparatus 10B as a secondary node.

It should be noted that, although the NR-NR dual connectivity will be described in the following embodiments, a user apparatus according to an embodiment of the present invention is not limited to the NR-NR dual connectivity, and may be applied to dual connectivity between a plurality of wireless communication systems using different RATS, that is, MR-DC.

Figure 3:
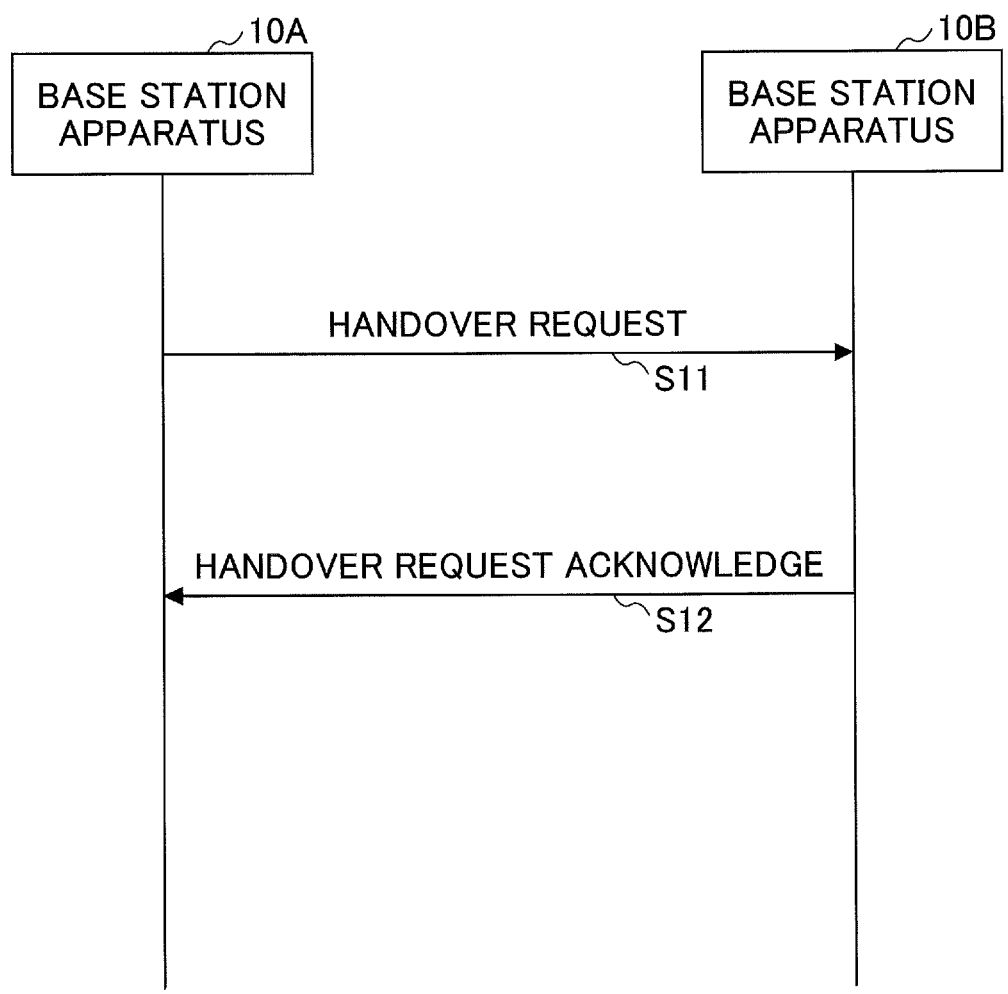
FIG. 3 is a sequence diagram illustrating a first operation example in an embodiment of the present invention.

FIG. 3 is a sequence diagram illustrating a first operation example in an embodiment of the present invention. A base station apparatus 10A illustrated in FIG. 3 is a source NG-RAN node of handover, and a base station apparatus 10B is a target NG-RAN node of handover. A user apparatus 20 starts handover from the base station apparatus 10A to the base station apparatus 10B.

In step S11, the base station apparatus 10A transmits "HANDOVER REQUEST" to the base station apparatus 10B. "HANDOVER REQUEST" includes an inter-node RRC message "HandoverPreparationInformation". Through "HandoverPreparationInformation", AS-Config (Access Stratum-Config), which is a radio access layer configuration, is transferred from the base station apparatus 10A to the base station apparatus 10B. The AS-Config has all fields necessary to describe AS context related to functions to be configured. Accordingly, "need" or "cond", which is applied to the fields of an RRC message between the user apparatus 20 and the base station apparatus 10, is not necessarily applied to the fields of an RRC message between the base station apparatuses 10. In the field interpretation, "need" means identification, maintenance, no-action, release, or the like, and "cond" means a configuration condition or a message condition. Some fields of an RRC message between the base station apparatuses 10 are always included regardless of "need" or "cond". For example, an information element "discardTimer" is a field that must be included. In step S12, the base station apparatus 10B, which is a target NG-RAN node, transmits "HANDOVER REQUEST ACKNOWLEDGE" to the base station apparatus 10A, which is a source NG-RAN node, and handover processing is started.

FIG. 4 is a drawing illustrating an information element used in the first operation example in an embodiment of the present invention. FIG. 4 is an example of an inter-node RRC message, "HandoverPreparationInformation". "HandoverPreparationInformation" is transmitted from the source NG-RAN node or other RAN to the target NG-RAN node.

As illustrated in FIG. 4, "HandoverPreparationInformation" includes an information element "HandoverPreparationInformation-IEs". "HandoverPreparationInformation-IEs" includes an information element "AS-Config". "AS-Config" includes an information element "RRCConfiguration". "RRCConfiguration" includes an information element "RRCConfiguration-IEs". "RRCConfiguration-IEs" includes an information element "RadioBearerConfig". "RadioBearerConfig" includes an information element "DRB-ToAddModList". "DRB-ToAddModList" includes an information element "DRB-ToAddMod". "DRB-ToAddMod" includes an information element "PDCPConfig". "PDCPConfig" includes an information element "discardTimer".

As illustrated in FIG. 4, "discardTimer" is an information element in which a timer value is configured. "discardTimer" is started when a PDCP SDU (Service Data Unit) is obtained from a higher layer in the PDCP layer. Upon expiration, the PDCP SDU is discarded.

As illustrated in FIG. 4, "discardTimer" is an option whose condition is "Setup", as shown as "OPTIONAL,— Cond Setup" between the user apparatus 20 and the base station apparatus 10. However, "discardTimer" may be transmitted from the source NG-RAN node to the target NG-RAN node via "HandoverPreparationInformation" as a mandatory field in an inter-node RRC message. That is, the information that is mandatory between the network nodes is transmitted as a mandatory field regardless of the configuration related to the corresponding field between the user apparatus 20 and the base station apparatus 10, thereby allowing the network to function appropriately.

Figure 5:
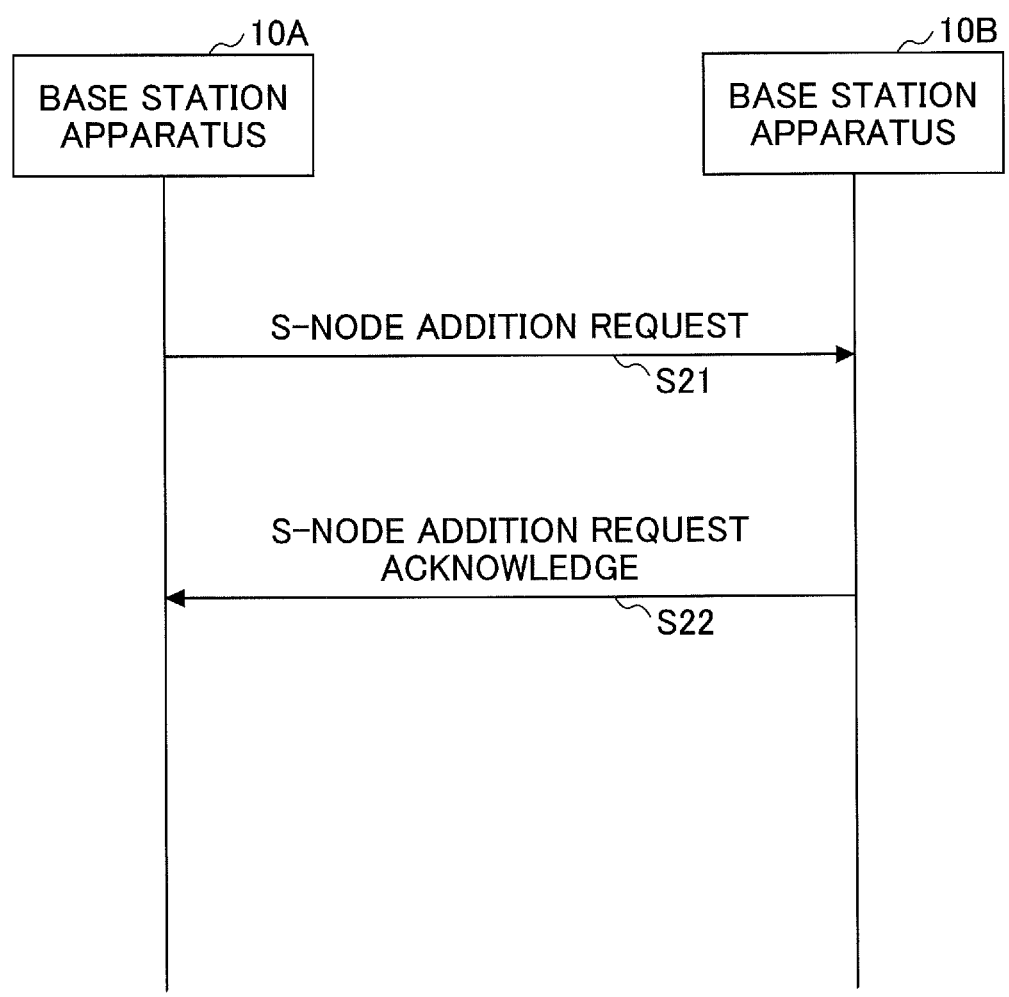
FIG. 5 is a sequence diagram illustrating a second operation example in an embodiment of the present invention.

FIG. 5 is a sequence diagram illustrating a second operation example in an embodiment of the present invention. A base station apparatus 10A illustrated in FIG. 5 is an NG-RAN master node, and a base station apparatus 10B is an NG-RAN secondary node.

In step S21, the base station apparatus 10A transmits "S-NODE ADDITION REQUEST" to the base station apparatus B. "S-NODE ADDITION REQUEST" includes an inter-node RRC message "CG-ConfigInfo". A request for establishing, modifying, or releasing connections in the secondary cell group is transferred from the base station apparatus 10A to the base station apparatus 10B via the "CG-ConfigInfo". In step S22, the base station apparatus 10B, which is a NG-RAN secondary node, transmits "S-NODE ADDITION REQUEST ACKNOWLEDGE" to the base station apparatus 10A, which is a NG-RAN master node, and allocates resources for DC to the user apparatus 20.

Note that, for example, "S-NODE ADDITION REQUEST" may be replaced by "S-NODE MODIFICATION REQUEST" or "S-NODE RELEASE REQUEST". "S-NODE MODIFICATION REQUEST" is a message requesting a change in the NG-RAN secondary node, and "S-NODE RELEASE REQUEST" is a message requesting a release in the NG-RAN secondary node.

FIG. 6 is a drawing illustrating an information element used in the second operation example in an embodiment of the present invention. FIG. 6 is an example of an inter-node RRC message "CG-ConfigInfo". "CG-ConfigInfo" is transmitted from the NG-RAN master node or the LTE-RAN master node to the NG-RAN secondary node. "CG-ConfigInfo" is an information element for establishing, modifying or releasing connections in the secondary cell group.

As illustrated in FIG. 6, "CG-ConfigInfo" includes an information element "CG-ConfigInfo-IEs". "CG-ConfigInfo-IEs" includes an information element "MeasConfigMN". In "measGapConfig", in "MeasConfigMN", "GapConfig" is configured using a data type "SetupRelease". The data type "SetupRelease" is a data type with which NULL is configured at the time of Release, and the information element is configured at the time of Setup. In other words, "GapConfig" is configured in "measGapConfig" at the time of Setup.

Here, in a case where the data type "SetupRelease" is used in the information element "CG-Config" for performing the radio configuration of the secondary cell group and the above-described "CG-ConfigInfo", a delta configuration is supported. In a case where the data type "SetupRelease" is not used in "CG-Config" and "CG-ConfigInfo", the transmission side must include all the fields related to functions configured in the user apparatus in the configuration. In other words, if a field is not included in the configuration, it means that a function corresponding to the field is not configured in the user apparatus 20, unless "SetupRelease" is used.

As described above, a delta configuration is supported in a case where the data type is SetupRelease. Regarding the various configurations configured in the user apparatus 20 during communication, the information configured in the user apparatus 20, such as radio bearer or secondary cell configuration, or the like, may vary depending on the communication status, etc. The network can maintain stable communication by changing the configurations appropriately in the user apparatus 20 each varying time. Configuration refers to information for performing communications configured in the user apparatus 20.

In the delta configuration, in a case where the user apparatus 20 or the network node changes a configuration value, only a difference from the value previously configured is indicated. In a case where a delta configuration is possible, it is desirable to apply a delta configuration, from the viewpoint of radio resource consumption or terminal power consumption. Various configurations already configured in the user apparatus 20 can be transferred between network nodes, and for example, a delta configuration can be maintained at the overlap time of network nodes according to mobility.

On the other hand, in a case of changing configuration values, a full configuration is known in which all configuration values are indicated. For example, full configuration is applied in a case where there is no compatibility between network nodes.

FIG. 7 is a specification change example related to an operation example in an embodiment of the present invention. As illustrated in FIG. 7, AS-Config, which is a configuration of radio access layer, is transferred from a source gNB to a target gNB through "HandoverPreparationInformation". The AS-Config has all fields necessary to describe AS context related to functions to be configured. Accordingly, "need" or "cond", which is applied to the fields of an RRC message between the user apparatus 20 and the base station apparatus 10, is not necessarily applied to the fields of an RRC message between the base station apparatuses 10. In the field interpretation, "need" means identification, maintenance, no-action, release, or the like, and "cond" means a configuration condition or a message condition.

Some fields of an RRC message between the base station apparatuses 10 are always included regardless of "need" or "cond". For example, an information element "discardTimer" is a field that must be included.

That is, the information that is mandatory between the network nodes is transmitted as a mandatory field regardless of the configuration related to the corresponding field between the user apparatus 20 and the base station apparatus 10, thereby allowing the network to function appropriately.

Further, as illustrated in FIG. 7, "CG-Config" and "CG-ConfigInfo" used for indicating configuration parameters of the user apparatus 20 may include all fields in a case where delta configuration is not performed. Based on the full CG configuration obtained from the source gNB, the target gNB can create a delta CG configuration. "need" or "cond", which is configured in the fields, is not necessarily applied to "CG-Config" and "CG-ConfigInfo".

Here, regarding the information element "measGapConfig", delta signaling may be supported. In a case where the "measGapConfig" field is not included in an inter-node RRC message, it may mean that the value indicated in the previous message is maintained. In addition, in a case where a new field, which is introduced into the "CG-Config" or "CG-ConfigInfo", supports delta signaling, the field may be defined always using the data type "SetupRelease" in the message containing the "CG-Config" or "CG-ConfigInfo".

Further, delta configuration may be supported in a case where the data type "SetupRelease" is used in "CG-Config" and "CG-ConfigInfo". In a case where the data type "SetupRelease" is not used in "CG-Config" and "CG-ConfigInfo", the transmission side may include all the fields related to functions configured in the user apparatus in the configuration. In other words, if a field is not included in the configuration, it may mean that a function corresponding to the field is not configured in the user apparatus 20 unless "SetupRelease" is used.

In other words, in a case where the data type "SetupRelease" is not used, all fields related to the functions configured in the user apparatus 20 are included in the configuration as mandatory and transmitted, thereby allowing the network to function properly.

According to the above-described embodiment, information that is mandatory between network nodes is transmitted as a mandatory field in a message between the network nodes regardless of the configuration related to the corresponding field between the user apparatus 20 and the base station apparatus 10, thereby allowing the network to function appropriately. Further, in a case where the data type "SetupRelease" is not used, the base station device 10 can transmit a message between network nodes including all fields related to functions configured in the user apparatus 20 as mandatory, thereby allowing the network to function appropriately.

In other words, it is possible to transmit and receive information that is mandatory between network nodes in a wireless communication system.

(Apparatus Configuration)

Next, examples of functional structures of the base station apparatus 10 and the user apparatus 20 that perform the processes and operations described above will be described. The base station apparatus 10 and the user apparatus 20 each have functions for performing an embodiment of the present invention. It should be noted that the base station apparatus 10 and the user apparatus 20 each may have only a part of the functions for performing an embodiment of the present invention.

<Base Station Apparatus 10>

Figure 8:
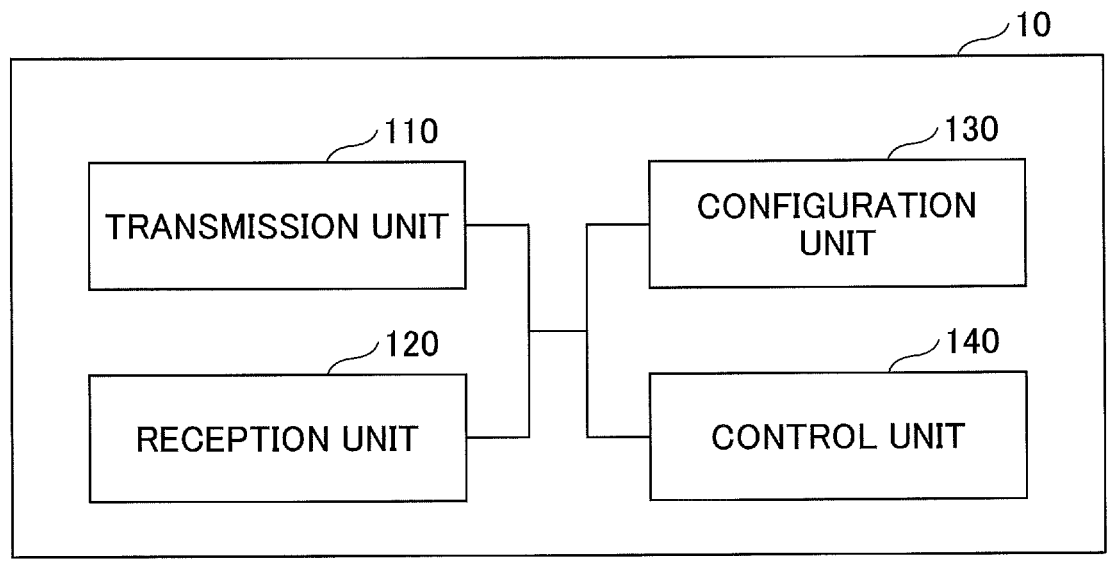
FIG. 8 is a drawing illustrating an example of a functional structure of a base station apparatus 10 according to an embodiment of the present invention.

FIG. 8 is a drawing illustrating an example of a functional structure of a base station apparatus 10 according to an embodiment of the present invention. As illustrated in FIG. 8, the base station apparatus 10 includes a transmission unit 110, a reception unit 120, a configuration unit (setting unit) 130, and a control unit 140. The functional structure illustrated in FIG. 8 is merely an example. Functional divisions and names of functional units may be anything as long as operations can be performed according to an embodiment of the present invention.

The transmission unit 110 has a function for generating a signal to be transmitted to the user apparatus 20 and for transmitting the signal wirelessly. Further, the transmission unit 110 transmits an inter-network-node message to another network node. The reception unit 120 has a function for receiving various signals transmitted from the user apparatus 20 and for obtaining, for example, upper layer information from the received signals. Further, the transmission unit 110 has a function for transmitting to the user apparatus 20 NR-PSS, NR-SSS, NR-PBCH, DL/UL control signals, etc. Further, the reception unit 120 receives an inter-network-node message from another network node.

The configuration unit 130 stores, in a storage device, pre-configured configuration information and various configuration information items to be transmitted to the user apparatus 20, and reads them from the storage device if necessary. The contents of the configuration information are, for example, configuration information related to communication of the user apparatus 20, such as the configuration of a radio bearer or a secondary cell.

As described in an embodiment of the present invention, the control unit 140 controls communication in which NR-DC is applied to the user apparatus 20. In addition, the control unit 140 acquires a configuration related to the communication of the user apparatus 20 from another network node or indicates the configuration to another network. In addition, the control unit 140 performs a delta configuration or full configuration regarding the configuration related to communication of the user apparatus 20. The functional units related to signal transmission in the control unit 140 may be included in the transmission unit 110, and the functional units related to signal reception in the control unit 140 may be included in the reception unit 120.

<User Apparatus 20>

Figure 9:
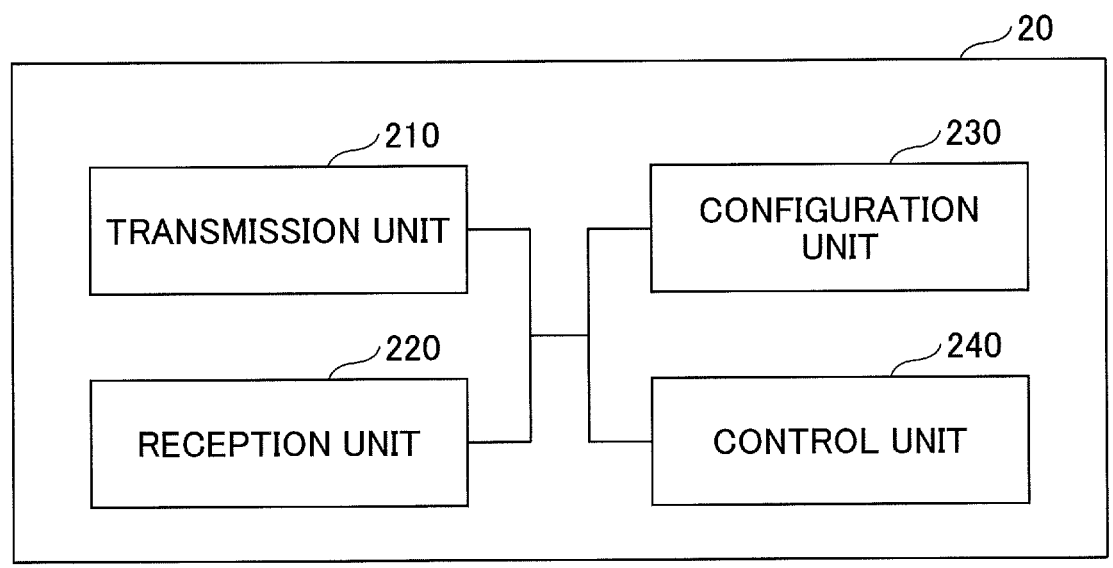
FIG. 9 is a drawing illustrating an example of a functional structure of a user apparatus 20 according to an embodiment of the present invention.

FIG. 9 is a drawing illustrating an example of a functional structure of a user apparatus 20 according to an embodiment of the present invention. As illustrated in FIG. 9, the user apparatus 20 includes a transmission unit 210, a reception unit 220, a configuration unit (setting unit) 230, and a control unit 240. The functional structure illustrated in FIG. 9 is merely an example. Functional divisions and names of functional units may be anything as long as operations can be performed according to an embodiment of the present invention.

The transmission unit 210 generates a transmission signal from transmission data and transmits the transmission signal wirelessly. The reception unit 220 receives various signals wirelessly and obtains upper layer signals from the received physical layer signals. Further, the reception unit 220 has a function for receiving NR-PSS, NR-SSS, NR-PBCH, DL/UL/SL control signals, etc., transmitted from the base station apparatus 10. Further, for example, with respect to the D2D communications, the transmission unit 210 transmits, to another user apparatus 20, PSCCH (Physical Sidelink Control Channel), PSSCH (Physical Sidelink Shared Channel), PSDCH (Physical Sidelink Discovery Channel), PSBCH (Physical Sidelink Broadcast Channel), etc., and the reception unit 120 receives, from the another user apparatus 20, PSCCH, PSSCH, PSDCH, or PSBCH.

The configuration unit 230 stores, in a storage device, various configuration information items received from the base station apparatus 10 or the user apparatus 20 via the reception unit 220, and reads them from the storage device if necessary. Further, the configuration (setting) unit 230 also stores preset configuration (setting) information. The contents of the configuration information are, for example, configuration information related to communication of the user apparatus 20, such as the configuration of a radio bearer or a secondary cell.

As described in an embodiment of the present invention, the control unit 240 performs communication in which NR-DC is applied. In addition, the control unit 240 receives information pertaining to wireless communication from the base station apparatus 10, controls wireless communication of the user apparatus 20 based on the information, and reports necessary information to the base station apparatus 10. The functional units related to signal transmission in the control unit 240 may be included in the transmission unit 210, and the functional units related to signal reception in the control unit 240 may be included in the reception unit 220.

(Hardware Structure)

In the above functional structure diagrams used for describing an embodiment of the present invention (FIG. 8 and FIG. 9), functional unit blocks are shown. The functional blocks (function units) are realized by a freely-selected combination of hardware and/or software. Further, realizing means of each functional block is not limited in particular. In other words, each functional block may be realized by a single apparatus in which multiple elements are coupled physically and/or logically, or may be realized by two or more apparatuses that are physically and/or logically separated and are physically and/or logically connected (e.g., wired and/or wireless). The functional blocks may be realized by combining the above-described one or more apparatuses with software.

Functions include, but are not limited to, judging, determining, calculating, processing, deriving, investigating, searching, checking, receiving, transmitting, outputting, accessing, resolving, selecting, establishing, comparing, assuming, expecting, and deeming; broadcasting, notifying, communicating, forwarding, configuring, reconfiguring, allocating, mapping, and assigning, etc. For example, a functional block (component) that functions to transmit is called a transmitting unit or a transmitter. In either case, as described above, the implementation method is not particularly limited.

Figure 10:
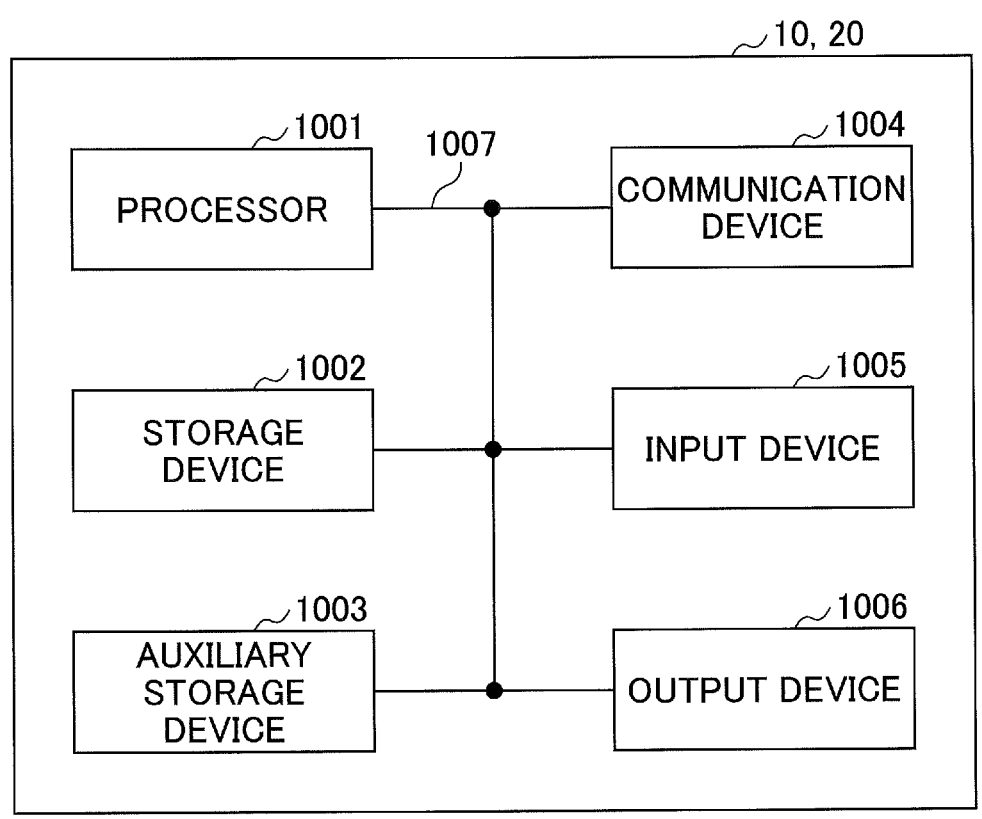
FIG. 10 is a drawing illustrating examples of hardware structures of a base station apparatus 10 or a user apparatus 20 according to an embodiment of the present invention.

For example, the base station apparatus 10, the user apparatus 20, or the like according to an embodiment of the present invention may function as a computer for processing the radio communication method illustrated by an embodiment of the present invention. FIG. 10 is a drawing illustrating an example of hardware structures of a base station apparatus 10 and a user apparatus 20 according to an embodiment of the present invention. Each of the base station apparatus 10 and the user apparatus 20 may be physically a computer apparatus including a processor 1001, a storage device 1002, an auxiliary storage device 1003, a communication device 1004, an input device 1005, an output device 1006, a bus 1007, etc.

It should be noted that, in the descriptions below, the term "apparatus" can be read as a circuit, a device, a unit, etc. The hardware structures of the base station apparatus 10 and the user apparatus 20 may include one or more of each of the apparatuses illustrated in the figure, or may not include some apparatuses.

Each function in the base station apparatus 10 and the user apparatus 20 is realized by having the processor 1001 perform an operation by reading predetermined software (programs) onto hardware such as the processor 1001 and the storage device 1001, and by controlling communication by the communication device 1004 and controlling at least one of reading and writing of data in the storage device 1001 and the auxiliary storage device 1003.

The processor 1001 controls the entire computer by, for example, controlling the operating system. The processor 1001 may include a central processing unit (CPU) including an interface with a peripheral apparatus, a control apparatus, a calculation apparatus, a register, etc. For example, the above-described control unit 140, control unit 240, and the like, may be implemented by the processor 1001.

Further, the processor 1001 reads a program (program code), a software module, or data from the auxiliary storage device 1003 and/or the communication device 1004, and performs various processes according to the program, the software module, or the data. As the program, a program is used that causes the computer to perform at least a part of operations according to an embodiment of the present invention described above. For example, the control unit 140 of the base station apparatus 10 illustrated in FIG. 8 may be realized by control programs that are stored in the storage device 1001 and are executed by the processor 1001. Further, for example, the control unit 240 of the user apparatus 20 illustrated in FIG. 9 may be realized by control programs that are stored in the storage device 1001 and are executed by the processor 1001. The various processes have been described to be performed by a single processor 1001. However, the processes may be performed by two or more processors 1001 simultaneously or sequentially. The processor 1001 may be implemented by one or more chips. It should be noted that the program may be transmitted from a network via a telecommunication line.

The storage device 1001 is a computer-readable recording medium, and may include at least one of a ROM (Read Only Memory), an EPROM (Erasable Programmable ROM), an EEPROM (Electrically Erasable Programmable ROM), a RAM (Random Access Memory), etc. The storage device 1001 may be referred to as a register, a cache, a main memory, etc. The storage device 1001 is capable of storing programs (program codes), software modules, or the like, that are executable for performing communication processes according to an embodiment of the present invention.

The auxiliary storage device 1003 is a computer-readable recording medium, and may include at least one of, for example, an optical disk such as a CD-ROM (Compact Disc ROM), a hard disk drive, a flexible disk, a magneto optical disk (e.g., compact disk, digital versatile disk, Blu-ray (registered trademark) disk), a smart card, a flash memory (e.g., card, stick, key drive), a floppy (registered trademark) disk, a magnetic strip, etc. The above recording medium may be a database including the storage device 1001 and/or the auxiliary storage device 1003, a server, or any other appropriate medium.

The communication device 1004 is hardware (transmission and reception device) for communicating with computers via at least one of a wired network and a wireless network, and may be referred to as a network device, a network controller, a network card, a communication module, etc. The communication device 1004 may comprise a high frequency switch, duplexer, filter, frequency synthesizer, or the like, for example, to implement at least one of a frequency division duplex (FDD) and a time division duplex (TDD). For example, the transmitting/receiving antenna, the amplifier unit, the transmitting/receiving unit, the transmission line interface, and the like, may be implemented by the communication device 1004. The transmitting/receiving unit may be physically or logically divided into a transmitting unit and a receiving unit.

The input device 1005 is an input device that receives an external input (e.g., keyboard, mouse, microphone, switch, button, sensor). The output device 1006 is an output device that outputs something to the outside (e.g., display, speaker, LED lamp). It should be noted that the input device 1005 and the output device 1006 may be integrated into a single device (e.g., touch panel).

Further, the apparatuses including the processor 1001, the storage device 1001, etc., are connected to each other via the bus 1007 used for communicating information. The bus 1007 may include a single bus, or may include different buses between the apparatuses.

Further, each of the base station apparatus 10 and the user apparatus 20 may include hardware such as a micro processor, a digital signal processor (DSP), an ASIC (Application Specific Integrated Circuit), a PLD (Programmable Logic Device), a FPGA (Field Programmable Gate Array), etc., and a part or all of each functional block may be realized by the hardware. For example, the processor 1001 may be implemented by at least one of the above hardware elements.

(Embodiment Summary)

As described above, according to an embodiment of the present invention, provided is a network node including: a control unit configured to configure an information element in a field included in a message between network nodes in a case where the field is mandatory in the message between the network nodes, the message being used for performing a communication configuration related to a user apparatus; and a transmission unit configured to transmit the message between the network nodes including the field in which the information element is configured, wherein the field is mandatory in a case where a predetermined condition is satisfied.

According to the above arrangement, information that is mandatory between network nodes is transmitted as a mandatory field in a message between the network nodes regardless of the configuration related to the corresponding field between the user apparatus 20 and the base station apparatus 10, thereby allowing the network to function appropriately. Further, in a case where the data type "SetupRelease" is not used, the base station device 10 can transmit a message between network nodes including all fields related to functions configured in the user apparatus 20 as mandatory, thereby allowing the network to function appropriately. In other words, it is possible to transmit and receive information that is mandatory between network nodes in a wireless communication system.

The message between the network nodes may be a handover request, and the predetermined condition may be determined regardless of whether the field is mandatory or not in a message between the user apparatus and the network node. According to the above arrangement, the network node can transmit a message between the network nodes as a mandatory field, regardless of the configuration of the corresponding field between the user apparatus 20 and the base station apparatus 10.

The field may be a timer used for discarding data in the PDCP (Packet Data Convergence Protocol) layer. With this configuration, the network node can transmit a message between network nodes with the discardTimer as a mandatory field.

The message between the network nodes may be a request for addition, modification, or release in the secondary node, and the predetermined condition may be that the field does not include a data type in which setup or release is specified. With this configuration, in a case where the data type "SetupRelease" is not used, the base station apparatus 10 can perform configuration by assuming that all fields related to functions configured in the user apparatus 20 are mandatory.

In a case where the field includes a data type in which setup or release is specified, the field may be capable of a delta configuration. With this configuration, in a case where the data type "SetupRelease" is used, the base station apparatus 10 can perform a delta configuration for the functions configured in the user apparatus 20.

(Supplement of Embodiment)

As described above, one or more embodiments have been described. The present invention is not limited to the above embodiments. A person skilled in the art should understand that there are various modifications, variations, alternatives, replacements, etc., of the embodiments. In order to facilitate understanding of the present invention, specific values have been used in the description. However, unless otherwise specified, those values are merely examples and other appropriate values may be used. The division of the described items may not be essential to the present invention. The things that have been described in two or more items may be used in a combination if necessary, and the thing that has been described in one item may be appropriately applied to another item (as long as there is no contradiction). Boundaries of functional units or processing units in the functional block diagrams do not necessarily correspond to the boundaries of physical parts. Operations of multiple functional units may be physically performed by a single part, or an operation of a single functional unit may be physically performed by multiple parts. The order of sequences and flowcharts described in an embodiment of the present invention may be changed as long as there is no contradiction. For the sake of description convenience, a base station apparatus 10 and a user apparatus 20 have been described by using functional block diagrams. However, the apparatuses may be realized by hardware, software, or a combination of hardware and software. The software executed by a processor included in a base station apparatus 10 according to an embodiment of the present invention and the software executed by a processor included in a user apparatus 20 according to an embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate recording medium.

Further, information indication (transmission, notification) may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC signaling, MAC signaling, broadcast information (MIB (Master Information Block), SIB (System Information Block))), other signals, or combinations thereof. Further, RRC signaling may be referred to as an RRC message. The RRC signaling may be, for example, an RRC connection setup message, an RRC connection reconfiguration message, or the like.

Each aspect/embodiment described in the present disclosure may be applied to at least one of a system using LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other appropriate systems, and a next generation system enhanced therefrom. Further, multiple systems may also be applied in combination (e.g., at least one of LTE and LTE-A combined with 5G, etc.).

The order of processing steps, sequences, flowcharts or the like of an aspect/embodiment described in the present specification may be changed as long as there is no contradiction. For example, in a method described in the present specification, elements of various steps are presented in an exemplary order. The order is not limited to the presented specific order.

The particular operations, that are supposed to be performed by the base station apparatus 10 in the present specification, may be performed by an upper node in some cases. In a network including one or more network nodes including a base station apparatus 10, it is apparent that various operations performed for communicating with a user apparatus 20 may be performed by the base station apparatus 10 and/or another network node other than the base station apparatus 10 (for example, but not limited to, MME or S-GW). According to the above, a case is described in which there is a single network node other than the base station apparatus 10. However, a combination of multiple other network nodes may be considered (e.g., MME and S-GW).

The information or signals described in this disclosure may be output from a higher layer (or lower layer) to a lower layer (or higher layer). The information or signals may be input or output through multiple network nodes.

The input or output information may be stored in a specific location (e.g., memory) or managed using management tables. The input or output information may be overwritten, updated, or added. The information that has been output may be deleted. The information that has been input may be transmitted to another apparatus.

A decision or a determination in an embodiment of the present invention may be realized by a value (0 or 1) represented by one bit, by a boolean value (true or false), or by comparison of numerical values (e.g., comparison with a predetermined value).

Software should be broadly interpreted to mean, whether referred to as software, firmware, middle-ware, microcode, hardware description language, or any other name, instructions, instruction sets, codes, code segments, program codes, programs, subprograms, software modules, applications, software applications, software packages, routines, subroutines, objects, executable files, executable threads, procedures, functions, and the like.

Further, software, instructions, information, and the like may be transmitted and received via a transmission medium. For example, in the case where software is transmitted from a website, server, or other remote source using at least one of wired line technologies (such as coaxial cable, fiber optic cable, twisted pair, digital subscriber line (DSL) and wireless technologies (infrared, microwave, etc.), at least one of these wired line technologies and wireless technologies is included within the definition of the transmission medium.

Information, a signal, or the like, described in the present specification may represented by using any one of various different technologies. For example, data, an instruction, a command, information, a signal, a bit, a symbol, a chip, or the like, described throughout the present application, may be represented by a voltage, an electric current, electromagnetic waves, magnetic fields, a magnetic particle, optical fields, a photon, or a combination thereof.

It should be noted that a term used in the present specification and/or a term required for understanding of the present specification may be replaced by a term having the same or similar meaning. For example, a channel and/or a symbol may be a signal (signaling). Further, a signal may be a message. Further, the component carrier (CC) may be referred to as a carrier frequency, cell, frequency carrier, or the like.

As used in the present disclosure, the terms "system" and "network" are used interchangeably.

Further, the information, parameters, and the like, described in the present disclosure may be expressed using absolute values, relative values from predetermined values, or they may be expressed using corresponding different information. For example, a radio resource may be what is indicated by an index.

The names used for the parameters described above are not used as limitations. Further, the mathematical equations using these parameters may differ from those explicitly disclosed in the present disclosure. Because the various channels (e.g., PUCCH, PDCCH) and information elements may be identified by any suitable names, the various names assigned to these various channels and information elements are not used as limitations.

In the present disclosure, the terms "BS: Base Station", "Radio Base Station", "Base Station Apparatus", "Fixed Station", "NodeB", "eNodeB (eNB)", "gNodeB (gNB)", "Access Point", "Transmission Point", "Reception Point", "Transmission/Reception Point", "Cell", "Sector", "Cell Group", "Carrier", "Component Carrier", and the like, may be used interchangeably. The base station may be referred to as a macro-cell, a small cell, a femtocell, a picocell and the like.

The base station may accommodate (provide) one or more (e.g., three) cells. In the case where the base station accommodates a plurality of cells, the entire coverage area of the base station may be divided into a plurality of smaller areas, each smaller area may provide communication services by means of a base station subsystem (e.g., an indoor small base station or a remote Radio Head (RRH)). The term "cell" or "sector" refers to a part or all of the coverage area of at least one of the base station and base station subsystem that provides communication services at the coverage.

In the present disclosure, terms such as "mobile station (MS)", "user terminal", "user equipment (UE)", "terminal", and the like, may be used interchangeably.

There is a case in which the mobile station may be referred to, by a person skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station and the mobile station may be referred to as a transmission apparatus, reception apparatus, communication apparatus, or the like. The at least one of the base station and the mobile station may be a device mounted on the mobile station, the mobile station itself, or the like. The mobile station may be a vehicle (e.g., a car, an airplane, etc.), an unmanned mobile body (e.g., a drone, an automated vehicle, etc.), or a robot (manned or unmanned). At least one of the base station and the mobile station may include an apparatus that does not necessarily move during communication operations. For example, at least one of the base station and the mobile station may be an IoT (Internet of Things) device such as a sensor.

Further, the base station in the present disclosure may be read as the user terminal. For example, each aspect/embodiment of the present disclosure may be applied to a configuration in which communications between the base station and the user terminal are replaced by communications between multiple user apparatuses 20 (e.g., may be referred to as D2D (Device-to-Device), V2X (Vehicle-to-Everything), etc.). In this case, the function of the base station apparatus 10 described above may be provided by the user apparatus 20. Further, the phrases "up" and "down" may also be replaced by the phrases corresponding to terminal-to-terminal communication (e.g., "side"). For example, an uplink channel, an downlink channel, or the like, may be read as a sidelink channel.

Further, the user terminal in the present disclosure may be read as the base station. In this case, the function of the user terminal described above may be provided by the base station.

The term "determining" used in the present specification may include various actions or operations. The "determining" may include, for example, a case in which "judging", "calculating", "computing", "processing", "deriving", "investigating", "looking up, search, inquiry" (e.g., looking up a table, database, or other data structures), or "ascertaining" is deemed as "determining". Further, the "determining" may include a case in which "receiving" (e.g., receiving information), "transmitting" (e.g., transmitting information), "inputting", "outputting", or "accessing" (e.g., accessing data in a memory) is deemed as "determining". Further, the "determining" may include a case in which "resolving", "selecting", "choosing", "establishing", "comparing", or the like is deemed as "determining". In other words, the "determining" may include a case in which a certain action or operation is deemed as "determining". Further, "decision" may be read as "assuming," "expecting," or "considering," etc.

The term "connected" or "coupled" or any variation thereof means any direct or indirect connection or connection between two or more elements and may include the presence of one or more intermediate elements between the two elements "connected" or "coupled" with each other. The coupling or connection between the elements may be physical, logical, or a combination thereof. For example, "connection" may be read as "access". As used in the present disclosure, the two elements may be thought of as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS or may be referred to as a pilot, depending on the applied standards.

The description "based on" used in the present specification does not mean "based on only" unless otherwise specifically noted. In other words, the phrase "base on" means both "based on only" and "based on at least".

Any reference to an element using terms such as "first" or "second" as used in the present disclosure does not generally limit the amount or the order of those elements. These terms may be used in the present disclosure as a convenient way to distinguish between two or more elements. Therefore, references to the first and second elements do not imply that only two elements may be employed or that the first element must in some way precede the second element.

"Means" included in the configuration of each of the above apparatuses may be replaced by "parts," "circuits," "devices," etc.

In the case where the terms "include", "including" and variations thereof are used in the present disclosure, these terms are intended to be comprehensive in the same way as the term "comprising". Further, the term "or" used in the present specification is not intended to be an "exclusive or".

A radio frame may include one or more frames in the time domain. Each of the one or more frames in the time domain may be referred to as a subframe. The subframe may further include one or more slots in the time domain. The subframe may be a fixed length of time (e.g., 1 ms) independent from the numerology.

The numerology may be a communication parameter that is applied to at least one of the transmission and reception of a signal or channel. The numerology may indicate at least one of, for example, SubCarrier Spacing (SCS), bandwidth, symbol length, cyclic prefix length, transmission time interval (TTI), number of symbols per TTI, radio frame configuration, specific filtering processing performed by the transceiver in the frequency domain, and specific windowing processing performed by the transceiver in the time domain.

The slot may include one or more symbols in the time domain, such as OFDM (Orthogonal Frequency Division Multiplexing) symbols, SC-FDMA (Single Carrier Frequency Division Multiple Access) symbols, and the like. The slot may be a time unit based on the numerology.

The slot may include a plurality of mini slots. Each mini slot may include one or more symbols in the time domain. Further, the mini slot may be referred to as a sub-slot. The mini slot may include fewer symbols than the slot. PDSCH (or PUSCH) transmitted in time units greater than a mini slot may be referred to as PDSCH (or PUSCH) mapping type A. PDSCH (or PUSCH) transmitted using a mini slot may be referred to as PDSCH (or PUSCH) mapping type B.

A radio frame, a subframe, a slot, a mini slot and a symbol all represent time units for transmitting signals. Different terms may be used for referring to a radio frame, a subframe, a slot, a mini slot and a symbol, respectively.

For example, one subframe may be referred to as a transmission time interval (TTI), multiple consecutive subframes may be referred to as a TTI, and one slot or one mini slot may be referred to as a TTI. In other words, at least one of the subframe and the TTI may be a subframe (1 ms) in an existing LTE, a period shorter than 1 ms (e.g., 1-13 symbols), or a period longer than 1 ms. It should be noted that the unit representing the TTI may be referred to as a slot, a mini slot, or the like, rather than a subframe.

The TTI refers to, for example, the minimum time unit for scheduling in wireless communications. For example, in an LTE system, a base station schedules each user apparatus 20 to allocate radio resources (such as frequency bandwidth, transmission power, etc. that can be used in each user apparatus 20) in TTI units. The definition of TTI is not limited to the above.

The TTI may be a transmission time unit, such as a channel-encoded data packet (transport block), code block, codeword, or the like, or may be a processing unit, such as scheduling or link adaptation. It should be noted that, when a TTI is provided, the time interval (e.g., the number of symbols) during which the transport block, code block, codeword, or the like, is actually mapped may be shorter than the TTI.

It should be noted that, when one slot or one mini slot is referred to as a TTI, one or more TTIs (i.e., one or more slots or one or more mini slots) may be the minimum time unit for scheduling. Further, the number of slots (the number of mini slots) constituting the minimum time unit of the scheduling may be controlled.

A TTI having a time length of 1 ms may be referred to as a normal TTI (a TTI in LTE Rel. 8-12), a long TTI, a normal subframe, a long subframe, a slot, and the like. A TTI that is shorter than the normal TTI may be referred to as a shortened TTI, a short TTI, a partial TTI (or fractional TTI), a shortened subframe, a short subframe, a mini slot, a subslot, a slot, or the like.

It should be noted that the long TTI (e.g., normal TTI, subframe, etc.) may be replaced with a TTI having a time length exceeding 1 ms, and the short TTI (e.g., shortened TTI, etc.) may be replaced with a TTI having a TTI length less than the TTI length of the long TTI and a TTI length greater than 1 ms.

A resource block (RB) is a time domain and frequency domain resource allocation unit and may include one or more consecutive subcarriers in the frequency domain. The number of subcarriers included in a RB may be the same, regardless of the numerology, and may be 12, for example. The number of subcarriers included in a RB may be determined on the basis of numerology.

Further, the time domain of a RB may include one or more symbols, which may be 1 slot, 1 mini slot, 1 subframe, or 1 TTI in length. One TTI, one subframe, etc., may each include one or more resource blocks.

It should be noted that one or more RBs may be referred to as physical resource blocks (PRBs, Physical RBs), sub-carrier groups (SCGs), resource element groups (REGs), PRB pairs, RB pairs, and the like.

Further, a resource block may include one or more resource elements (RE). For example, 1 RE may be a radio resource area of one sub-carrier and one symbol.

The bandwidth part (BWP) (which may also be referred to as a partial bandwidth, etc.) may represent a subset of consecutive common RBs (common resource blocks) for a given numerology in a carrier. Here, a common RB may be identified by an index of RB relative to the common reference point of the carrier. A PRB may be defined in a BWP and may be numbered within the BWP.

BWP may include BWP for UL (UL BWP) and BWP for DL (DL BWP). For a UE, one or more BWPs may be configured in one carrier.

At least one of the configured BWPs may be activated, and the UE may assume that the UE will not transmit and receive signals/channels outside the activated BWP. It should be noted that the terms "cell" and "carrier" in this disclosure may be replaced by "BWP."

Structures of a radio frame, a subframe, a slot, a mini slot, and a symbol described above are exemplary only. For example, the number of subframes included in a radio frame, the number of slots per subframe or radio frame, the number of mini slots included in a slot, the number of symbols and RBs included in a slot or mini slot, the number of subcarriers included in a RB, the number of symbols in a TTI, the symbol length, the cyclic prefix (CP) length, and the like, may be changed in various ways.

In the present disclosure, where an article is added by translation, for example "a", "an", and "the", the disclosure may include that the noun following these articles is plural.

In this disclosure, the term "A and B are different" may mean "A and B are different from each other." It should be noted that the term "A and B are different" may mean "A and B are different from C." Terms such as "separated" or "combined" may be interpreted in the same way as the above-described "different".

An aspect/embodiment described in the present specification may be used independently, may be used in combination, or may be used by switching according to operations. Further, notification (transmission/reporting) of predetermined information (e.g., notification (transmission/reporting) of "X") is not limited to an explicit notification (transmission/reporting), and may be performed by an implicit notification (transmission/reporting) (e.g., by not performing notification (transmission/reporting) of the predetermined information).

Note that, in the present disclosure, AS-Config, CG-Config, or CG-ConfigInfo is an example of communication configurations related to the user apparatus. The discardTimer is an example of a timer used for discarding data. HANDOVER REQUEST is an example of a handover request. S-NODE ADDITION REQUEST is an example of a secondary node addition request. The data type "SetupRelease" is an example of a data type in which setup or release is specified.

As described above, the present invention has been described in detail. It is apparent to a person skilled in the art that the present invention is not limited to one or more embodiments of the present invention described in the present specification. Modifications, alternatives, replacements, etc., of the present invention may be possible without departing from the subject matter and the scope of the present invention defined by the descriptions of claims. Therefore, the descriptions of the present specification are for illustrative purposes only, and are not intended to be limitations to the present invention.

DESCRIPTION OF THE REFERENCE NUMERALS

10 Base station apparatus
110 Transmission unit
120 Reception unit
130 Configuration unit
140 Control unit
20 User apparatus
210 Transmission unit
220 Reception unit
230 Configuration unit
240 Control unit
1001 Processor
1002 Storage device
1003 Auxiliary storage device
1004 Communication device
1005 Input device
1006 Output device

The invention claimed is:

1. A base station comprising:
a processor configured to include a specific field as a mandatory field in a message between base stations; and a transmitter configured to transmit the message between the base stations to another base station, wherein the specific field as the mandatory field between the base stations is regardless of a configuration of a field corresponding to the specific field in a message between a terminal and the base station, and wherein the field corresponding to the specific field in the message between the terminal and the base station is included in the message between the terminal and the base station in a case of a setup.

2. The base station according to claim 1, wherein the message between the base stations is HandoverPreparationInformation, and the specific field is discardTimer.

3. A communication method of a base station, comprising:

including a specific field as a mandatory field in a message between base stations; and transmitting the message between the base stations to another base station wherein the specific field as the mandatory field between the base stations is regardless of a configuration of a field corresponding to the specific field in a message between a terminal and the base station, and wherein the field corresponding to the specific field in the message between the terminal and the base station is included in the message between the terminal and the base station in a case of a setup.

* * * * *